US012619078B2

(12) United States Patent
Martinez

(10) Patent No.: US 12,619,078 B2
(45) Date of Patent: May 5, 2026

(54) DEVICE FOR PROJECTING AN IMAGE FORMED BY A SCREEN

(71) Applicant: COMMISSARIAT A L'ENERGIE ATOMIQUE ET AUX ENERGIES ALTERNATIVES, Paris (FR)

(72) Inventor: Christophe Martinez, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 261 days.

(21) Appl. No.: 18/399,969

(22) Filed: Dec. 29, 2023

(65) Prior Publication Data

US 2024/0219726 A1     Jul. 4, 2024

(30) Foreign Application Priority Data

Dec. 29, 2022    (FR) ...................................... 22 14636

(51) Int. Cl.
    *G02B 27/01*       (2006.01)
    *G09G 3/00*       (2006.01)

(52) U.S. Cl.
    CPC ......... *G02B 27/0172* (2013.01); *G09G 3/002* (2013.01); *G02B 2027/0174* (2013.01)

(58) Field of Classification Search
None
See application file for complete search history.

(56) References Cited

U.S. PATENT DOCUMENTS

2004/0227703 A1   11/2004   Lamvik et al.
2006/0228073 A1*   10/2006   Mukawa ................. G02B 5/18
                                             385/31

2008/0239424 A1   10/2008   Mukawa et al.
2010/0220295 A1   9/2010   Mukawa et al.
2011/0211239 A1   9/2011   Mukawa et al.
2012/0081789 A1   4/2012   Mukawa et al.
2012/0206811 A1   8/2012   Mukawa et al.
2013/0155513 A1   6/2013   Mukawa et al.
               (Continued)

OTHER PUBLICATIONS

French Preliminary Search Report issued Jul. 21, 2023 in French Application 22 14636 filed on Dec. 29, 2022, 10 pages (with English Translation of Categories of Cited Documents).

*Primary Examiner* — Ryan Crockett
(74) *Attorney, Agent, or Firm* — Oblon, McClelland, Maier & Neustadt, L.L.P.

(57)                ABSTRACT

The invention relates to a device for projecting an image onto an eye, the device comprising:

a light emitter, configured to emit light waves along various respective emission axes;

an optical combiner, optically coupled to the light emitter, and configured to form, from each light wave emitted by the light emitter, a collimated light wave that propagates to the pupil of the eye;

the device being characterized in that:

the light emitter comprises a screen, comprising various pixels, each pixel being configured to emit a divergent light wave that propagates around an emission axis, the various pixels emitting respective divergent light waves that propagate along various emission axes, respectively;

the optical combiner is configured to receive each light wave emitted by a pixel and to form a collimated light wave that propagates towards a central position corresponding to the centre of the pupil of the eye.

14 Claims, 14 Drawing Sheets

Fig. 2

(56)        References Cited

U.S. PATENT DOCUMENTS

| | | | |
|---|---|---|---|
| 2015/0355467 A1 | 12/2015 | Mukawa et al. | |
| 2015/0370073 A1* | 12/2015 | Martinez | G02B 6/0036 |
| | | | 359/630 |
| 2016/0170215 A1 | 6/2016 | Mukawa et al. | |
| 2016/0377865 A1* | 12/2016 | Alexander | G02B 27/0081 |
| | | | 345/8 |
| 2017/0184776 A1* | 6/2017 | El-Ghoroury | G02B 30/50 |
| 2018/0292647 A1* | 10/2018 | Fattal | G02B 27/0101 |
| 2020/0209646 A1 | 7/2020 | El-Ghoroury et al. | |
| 2020/0310115 A1* | 10/2020 | Fattal | G02B 6/005 |
| 2023/0400695 A1* | 12/2023 | Tremblay | G02B 27/0176 |
| 2024/0219725 A1* | 7/2024 | Martinez | G02B 27/0172 |

* cited by examiner

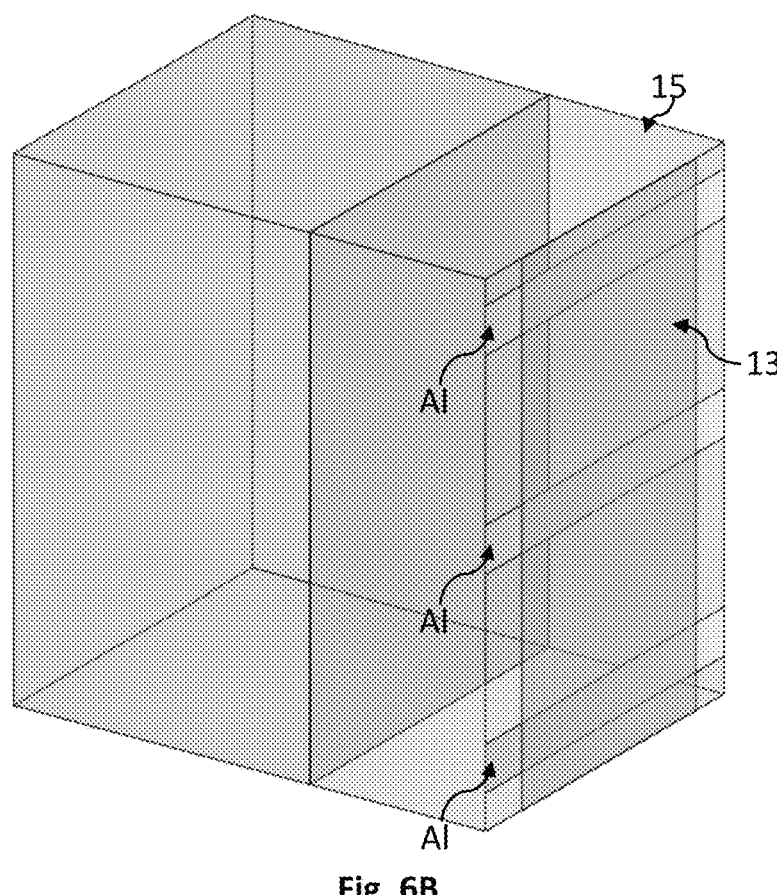
Fig. 6B
Fig. 6C

DEVICE FOR PROJECTING AN IMAGE FORMED BY A SCREEN

TECHNICAL FIELD

The technical field of the invention relates to a directional screen and use thereof in a device for projecting an image onto an eye, for example in augmented-reality applications.

PRIOR ART

Wearable augmented-reality devices, such as glasses, allow a real scene to be observed while complementary information is viewed. This type of device is frequently based on micro-displays, allowing an image to be formed in immediate proximity to an eye of a user. Such micro-displays may for example be integrated into a pair of glasses. An optical system, comprising a set of lenses, allows a clear image to be perceived by the eye.

U.S. Pat. No. 6,963,2317, and the publication Martinez "See-through holographic retinal projection display concept", Optica, Vol. 5 No. 10, October 2018, describe a device allowing projection, onto the retina of an eye, without a screen or an optical system. The device comprises a transparent integrated optical circuit composed of an array of nanoscale light guides, of an array of electrodes and of a holographic film. Such a device is compact, and allows a large field of view to be obtained. In addition, it makes it possible not to use bulky optical systems of complex design.

The light guides allow a set of emission points to be defined on the holographic film, each point being capable of being illuminated by light extracted from one light guide. The set of emission points is subdivided into various subsets, each subset comprising emission points distributed, as randomly as possible, over the holographic film. The emission points of a given subset may be simultaneously illuminated by various light guides. Under the effect of illumination, each emission point of the same subset emits a light wave that propagates in the same direction to the pupil of the eye, so as to form a single spot of light on the retina. In this way, each subset of emission points allows a pixel of the image perceived by the user to be formed. An image may be formed by successively illuminating various subsets of points, so as to form an image comprising a high number of pixels.

Such a configuration makes it possible to form a very compact device. However, this presupposes use of a high number of different laser sources.

Other technologies have been described that allow an image to be projected onto an eye using a compact device. The U.S. Pat. No. 10,254,547 for example describes a pair of glasses comprising a device for projecting a virtual image. The operating principle is schematically shown in FIG. 1. A light emitter E is place on the frame M of a pair of glasses. The light emitter E generates light beams F that propagate to a holographic reflector H. The holographic reflector H is formed on the lens of the glasses. It is configured to reflect each light beam towards the pupil P of an eye O of a user. The light emitter is formed by a light source coupled to a movable mirror. The movable mirror is moved, so as to successively form light beams that scan the holographic reflector. Thus, the user perceives reflected light beams, of various angular directions. When the intensity of each beam is modulated during the scan, the user perceives an image.

Other documents describe configurations in which a light beam scans a holographic reflector. Mention may for example be made of US2019/0285897 or US20180299680.

One drawback of scan-based configurations is that the eye box is small in size. An eye box is a volume in which the eye may be moved while still perceiving a sharp image. The movement of the eye of a user may be dynamic, when the eye is rotated to scan the field of view. It may also vary from one user to another because of differences between interpupillary distances. With a small eye box, a device may be suitable for one user but not for another, for example if the two users have different interpupillary distances.

Another drawback is related to the need to use a mechanical system to perform the scan. Use of a mechanical scanning system and of moving components increases the complexity and cost of the device.

The inventors provide an alternative configuration to the aforementioned scanning-based projecting devices. The objective is to provide a solution free of moving components, while improving user comfort, by increasing the size of the eye box.

SUMMARY OF THE INVENTION

A first subject of the invention is a device for projecting an image onto an eye, the device comprising:

a light emitter, configured to emit light waves along various respective emission axes;

an optical combiner, optically coupled to the light emitter, and configured to form, from each light wave emitted by the light emitter, a collimated light wave that propagates to the pupil of the eye;

wherein the light emitter comprises a screen, comprising various pixels, each pixel being configured to emit a divergent light wave that propagates around an emission axis, the various pixels emitting respective divergent light waves that propagate along various emission axes, respectively;

the optical combiner is configured to receive each light wave emitted by a pixel and to form a collimated light wave that propagates towards a central position corresponding to the centre of the pupil of the eye.

The device may comprise a convergent lens interposed between the screen and the optical combiner, the convergent lens extending around a centre, the centre of the lens forming, with a centre of the combiner, an optical axis of the device, the lens being placed such that:

the image of the screen, as generated by the convergent lens, is formed in an object focal plane of the combiner;

the image of the centre of the convergent lens, as generated by the combiner, is formed at the central position;

so that the collimated light wave, resulting from the combiner, reaches the central position at an angle dependent on the position of the pixel of the screen.

According to one preferred embodiment:

the screen is a directional screen, each pixel being configured to emit a divergent light wave along a predefined emission axis, the light wave propagating such as to make a predefined divergence angle to the emission axis;

the respective emission axes of the pixels converge to the centre of the convergent lens.

The screen may comprise a stack comprising:

light guides, each light guide being coupled to a plurality of diffraction gratings, which are distributed over the length of the light guide, each diffraction grating being electrically modulatable, each diffraction grating being configured to be electrically modulated so as to extract light propagating through the light guide;

electrodes, each electrode being associated with a plurality of diffraction gratings coupled to various light guides, respectively, each electrode being configured to modulate each diffraction grating with which it is associated;

each pixel of the screen corresponding to an association between an electrode and a diffraction grating coupled to a light guide;

so that under the effect of illumination by light extracted from the light guide, each pixel is configured to emit a divergent light wave that propagates around an emission axis of the pixel, thereby forming an emission cone, defined by a divergence angle around the emission axis of the pixel.

The screen may comprise a holographic film subdivided into various elementary regions, each elementary region being associated with the diffraction grating of one pixel, and being configured to emit the divergent light wave, along the emission axis and with the divergence angle of the pixel, under the effect of light extracted by the diffraction grating with which it is associated.

According to one possibility:

a plurality of light guides are connected to the same light source;

a light modulator lies between the light source and each light guide, so as to modulate an intensity of the light emitted by the light source and fed to each light guide.

The device may comprise a plurality of light sources, each light source being optically connected to a plurality of light guides.

Various light sources may be configured to emit light at various respective wavelengths.

The pixels may be arranged in:

rows, each row being defined by one light guide, the light guide extending over the length of various pixels in the row;

columns, each column being defined by one electrode, the electrode extending over the length of various pixels over the length of the column.

The device may comprise:

a plurality of convergent lenses aligned parallel to the directional screen, each lens extending around a centre and having the same object focal plane;

the device being such that the screen is placed parallel to each convergent lens;

each convergent lens is associated with pixels of the directional screen;

the emission axis of each pixel associated with the lens converges to the centre of the convergent lens with which it is associated.

The device can be such that:

two adjacent pixels are separated by a spatial pitch;

the screen comprises a central part, encircled by a peripheral part;

the spatial pitch between two adjacent pixels of the central part is smaller than the spatial pitch between two adjacent pixels of the peripheral part.

Preferably, the combiner is a holographic combiner.

The device can be such that:

the screen emits light in at least one emission spectral band;

the holographic combiner is transparent outside of the or each emission spectral band;

the holographic combiner forms a convergent lens in the or each emission spectral band.

The device may be such that the holographic combiner forms a reflector in the or each emission spectral band.

The device may be such that the convergent lens is movable translationally with respect to the screen, along the optical axis. The device may be such that the convergent lens has a variable focal length.

By collimated light wave, what is meant is a light wave the divergence or convergence of which is weak enough for the wave to be considered to be formed from beams propagating parallel to one another. By weak divergence or convergence, what is meant is making a divergence (or convergence) angle of less than 2° or than 1°.

Another subject of the invention is a directional screen, comprising various pixels:

each pixel being configured to emit a divergent light wave that propagates around an emission axis, the various pixels emitting respective divergent light waves that propagate along various emission axes, respectively;

each pixel being configured to emit a divergent light wave along a predefined emission axis, the light wave propagating such as to make a predefined divergence angle to the emission axis.

The screen may comprise a stack comprising:

light guides, each light guide being coupled to a plurality of diffraction gratings, which are distributed over the length of the light guide, each diffraction grating being electrically modulatable, each diffraction grating being configured to be electrically modulated so as to extract light propagating through the light guide;

electrodes, each electrode being associated with a plurality of diffraction gratings coupled to various light guides, respectively, each electrode being configured to modulate each diffraction grating with which it is associated;

each pixel of the screen corresponding to an association between an electrode and a diffraction grating coupled to a light guide;

so that under the effect of illumination by light extracted from the light guide, each pixel is configured to emit a divergent light wave that propagates around an emission axis of the pixel, thereby forming an emission cone, defined by a divergence angle around the emission axis of the pixel.

The screen may comprise a holographic film subdivided into various elementary regions, each elementary region being associated with the diffraction grating of one pixel, and being configured to emit the divergent light wave, along the emission axis and with the divergence angle of the pixel, under the effect of light extracted by the diffraction grating with which it is associated.

According to one possibility:

a plurality of light guides are connected to the same light source;

a light modulator lies between the light source and each light guide, so as to modulate an intensity of the light emitted by the light source and fed to each light guide.

The screen may comprise a plurality of light sources, each light source being optically connected to a plurality of light guides. Various light sources may be configured to emit light at various respective wavelengths.

The pixels may be arranged in:

rows, each row being defined by one light guide, the light guide extending over the length of various pixels in the row;

columns, each column being defined by one electrode, the electrode extending over the length of various pixels over the length of the column.

The invention will be better understood on reading the description of the examples of embodiment that are presented, in the rest of the description, with reference to the figures listed below.

FIGURES

Figure 3A:
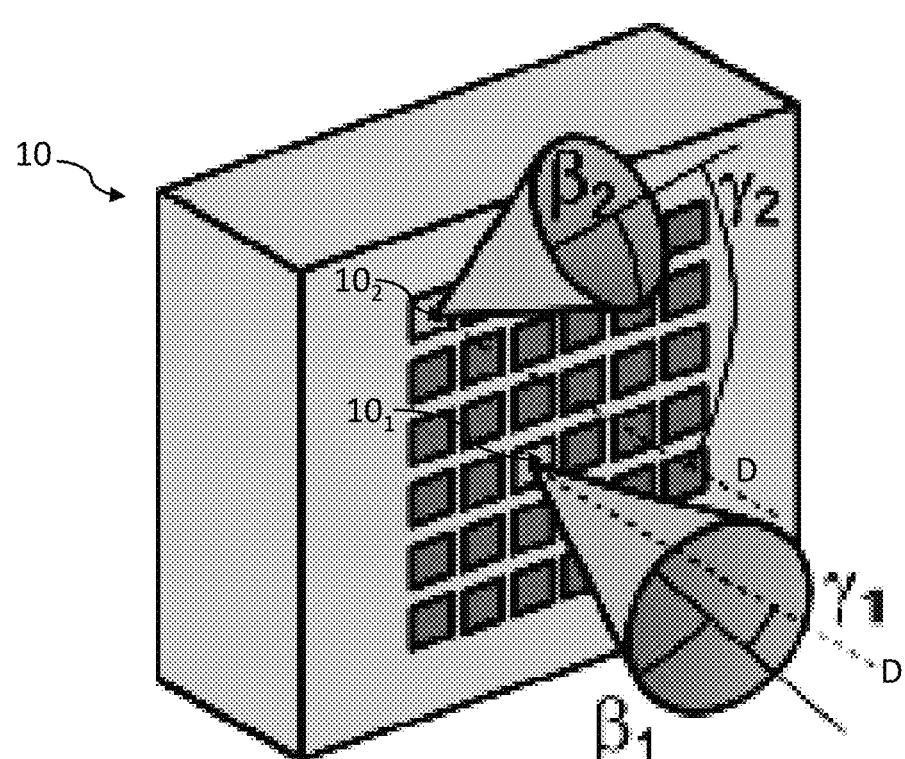

FIG. 3A schematically shows the angular emission characteristics of pixels of a directional screen.

Figure 3B:
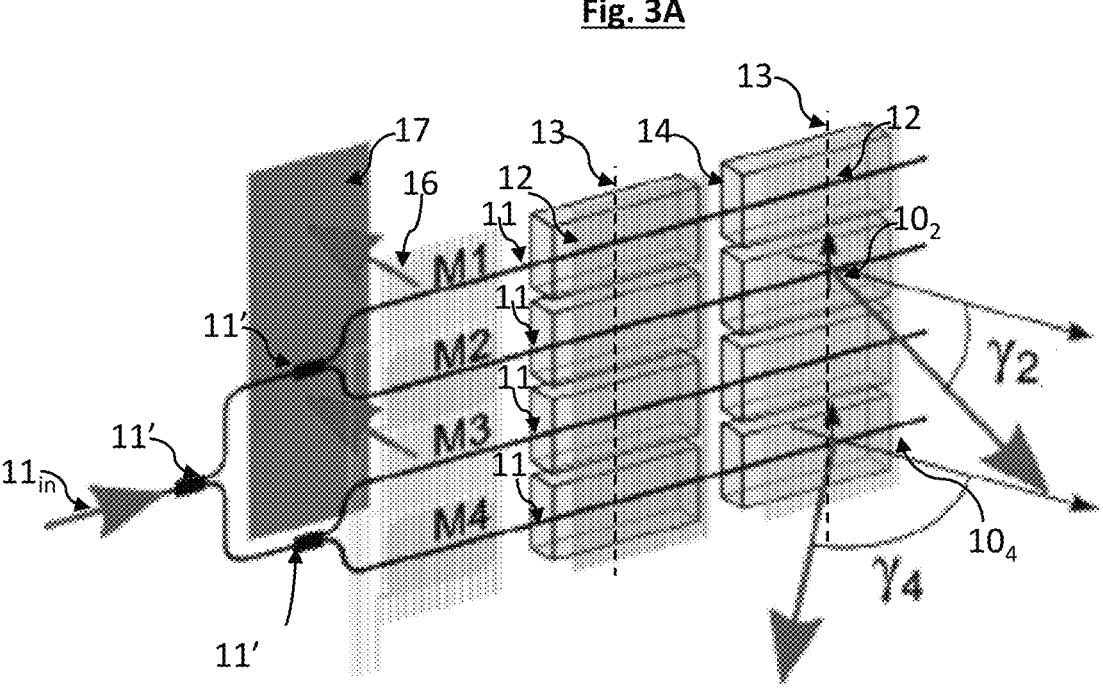

FIG. 3B shows the structure of a directional screen.

Figure 4:
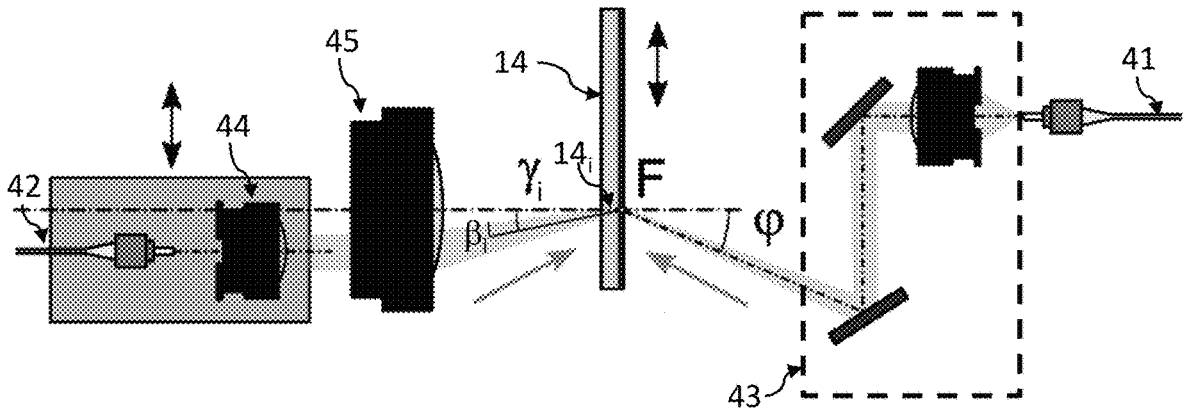

FIG. 4 shows a hologram of a directional screen being recorded.

Figure 5A:
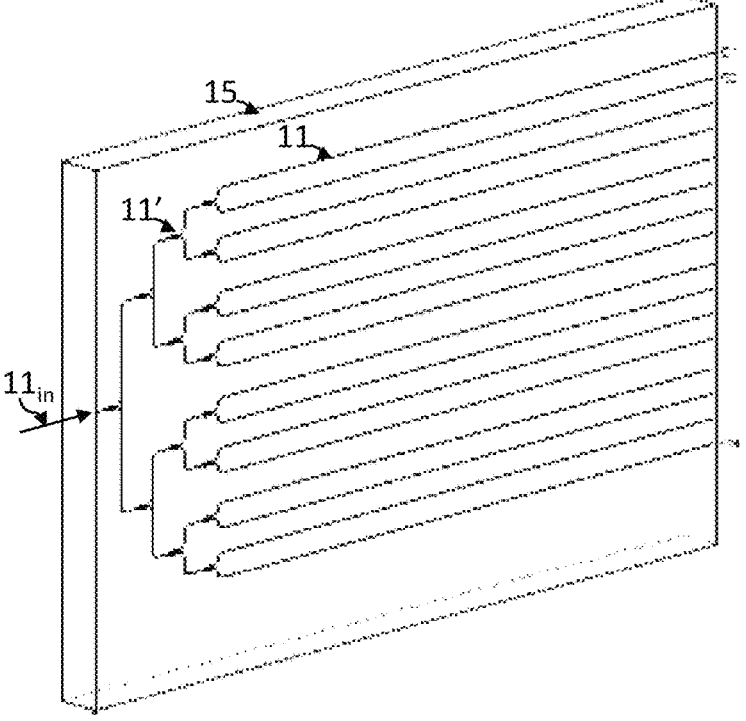

FIG. 5A shows a layer of a directional screen, in which layer light guides are formed.

Figure 5B:
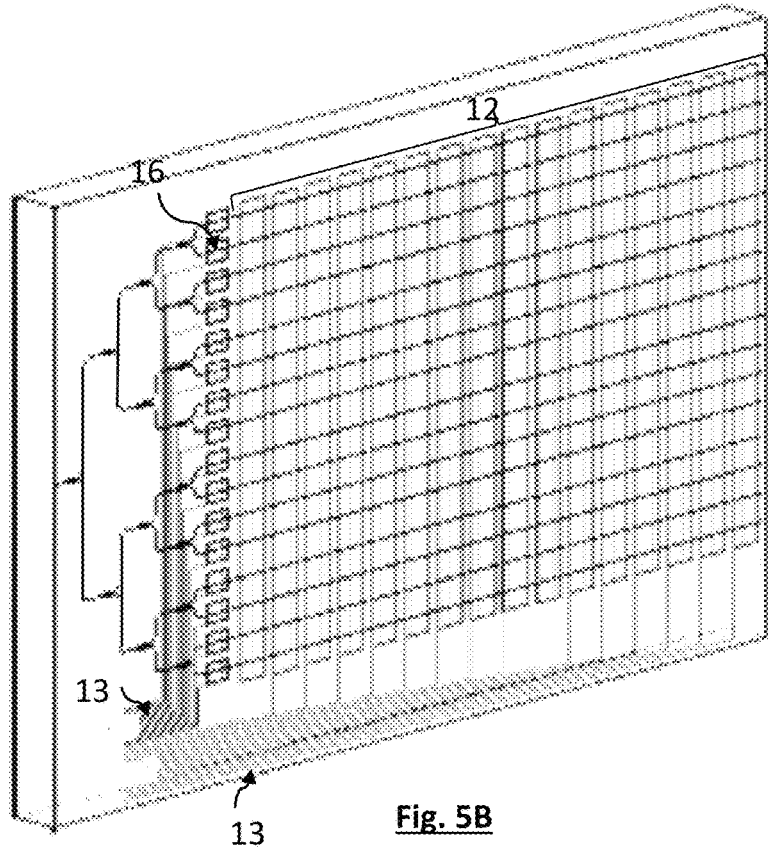

FIG. 5B shows a layer of a directional screen, in which layer electrically activatable diffraction gratings coupled to electrodes have been formed.

Figure 5C:
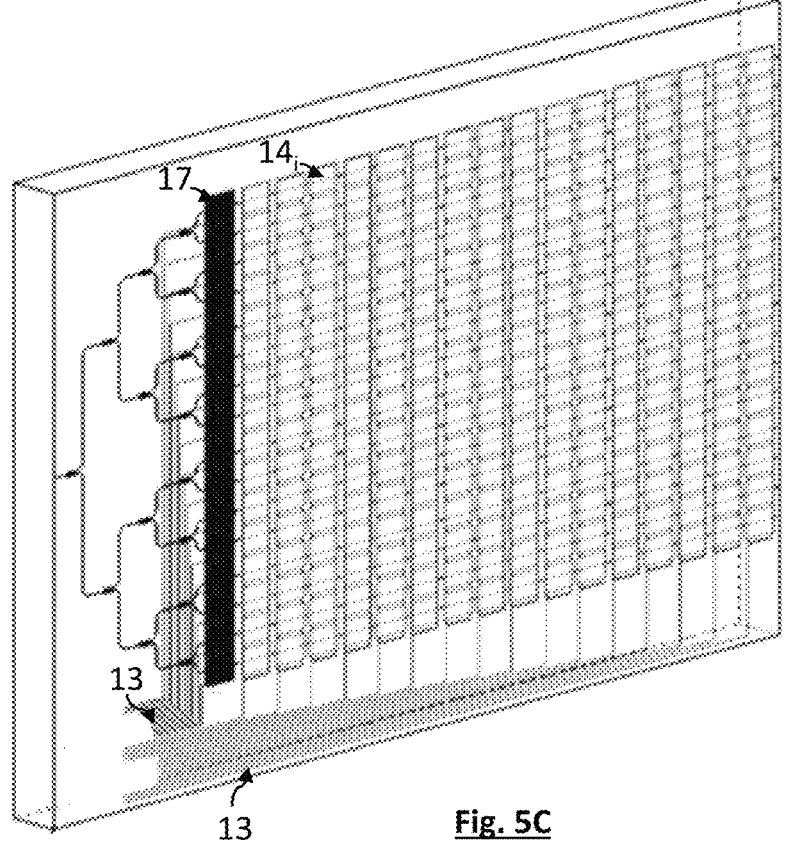

FIG. 5C shows a layer of a directional screen comprising previously recorded holograms.

Figure 5D:
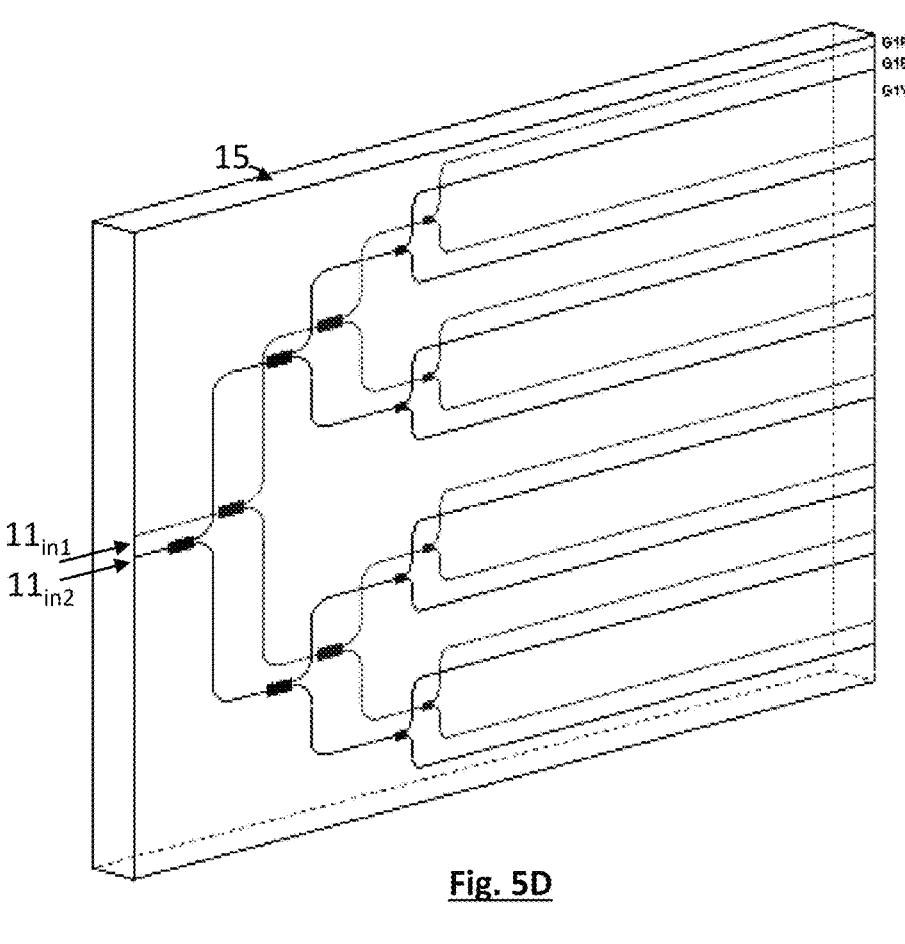

FIG. 5D shows a variant of a directional screen allowing various light sources, potentially emitting in various spectral bands, to be used.

FIGS. 6A to 6F schematically show the various layers forming a directional screen.

Figures 7A, 7B, 7C:
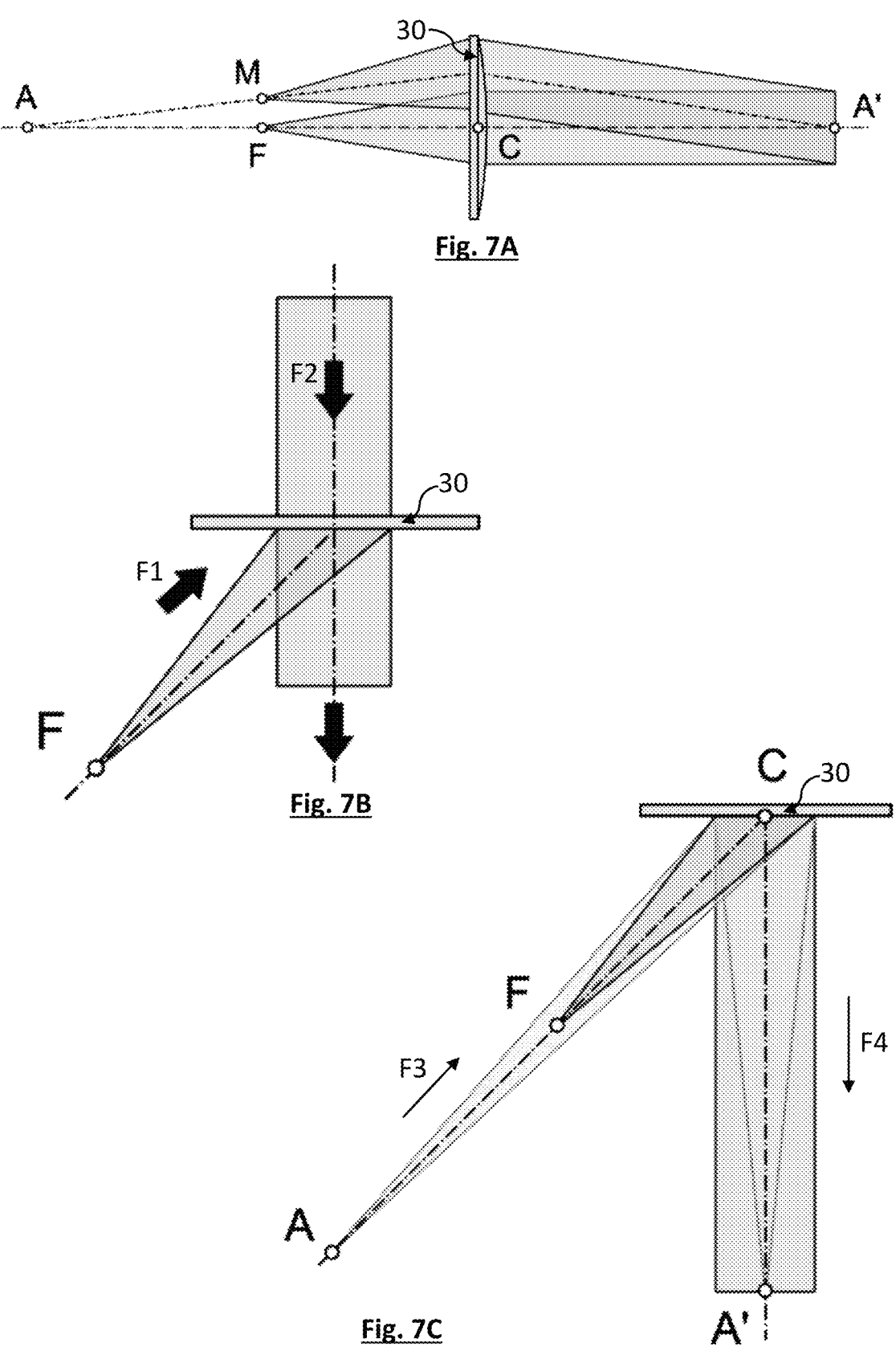

FIG. 7A is an optical schematic of a convergent lens.

FIG. 7B shows a phase of recording one portion of the holographic lens.

FIG. 7C shows a use of the holographic lens.

Figure 8A:
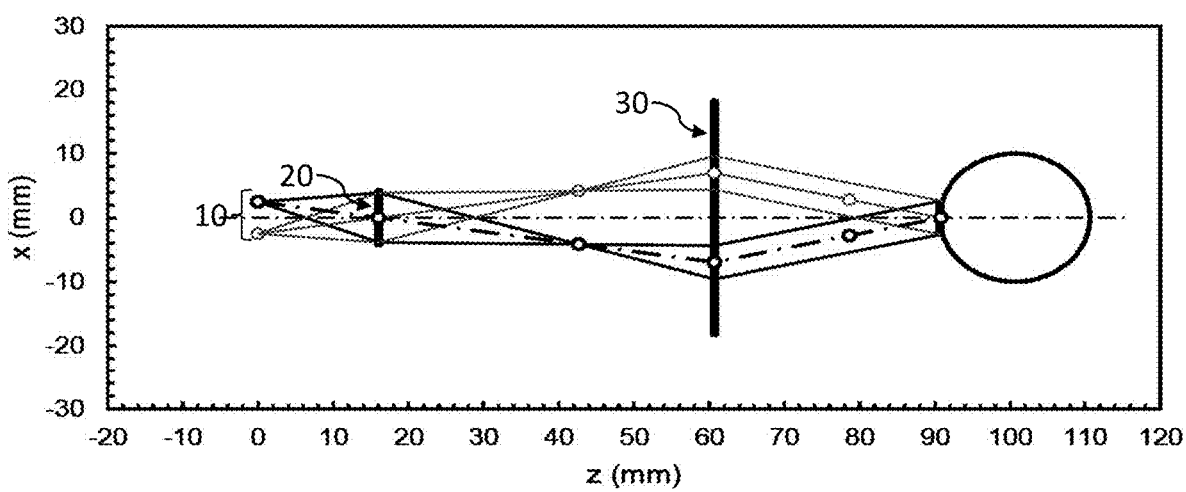
Figure 8B:
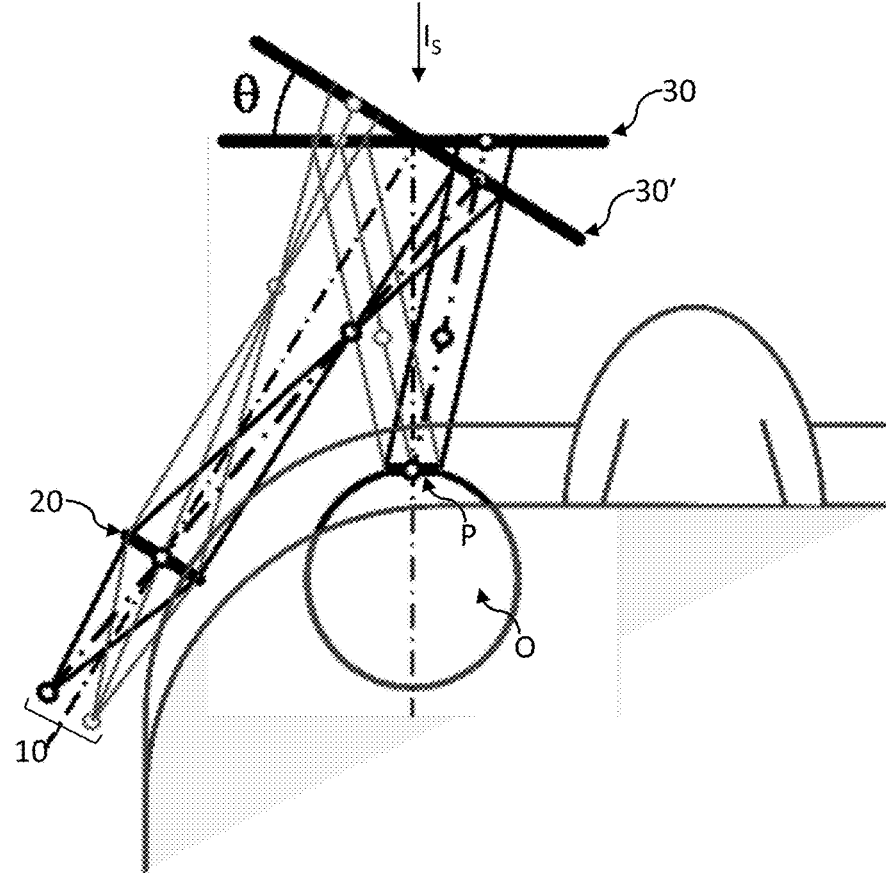

FIGS. 8A and 8B schematically show a first example of embodiment.

Figure 8C:
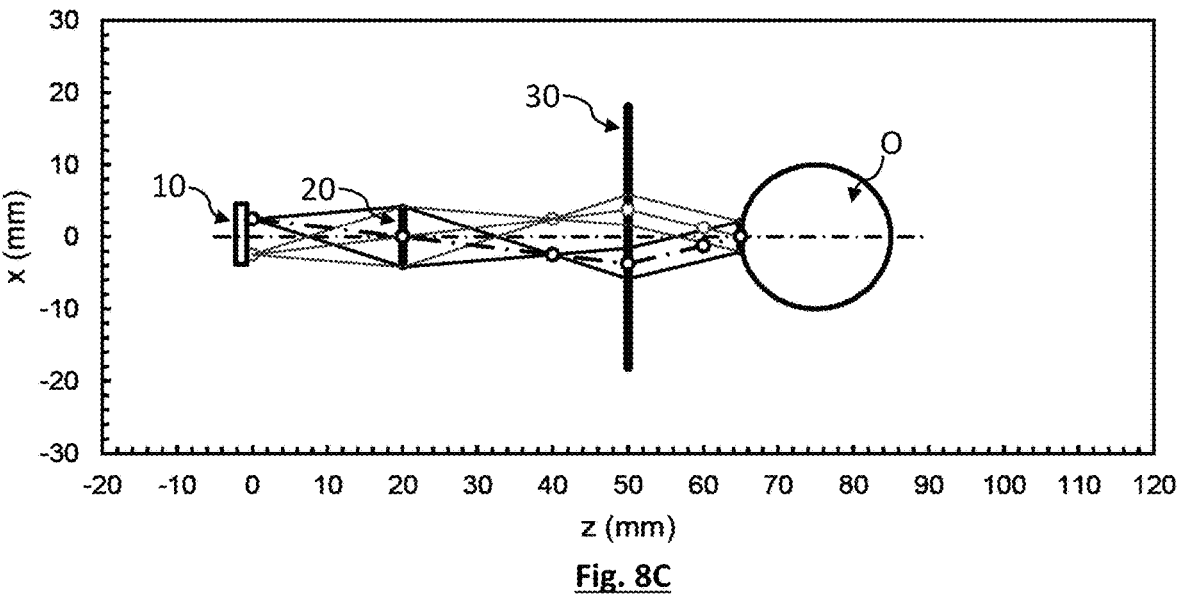
Figure 8D:
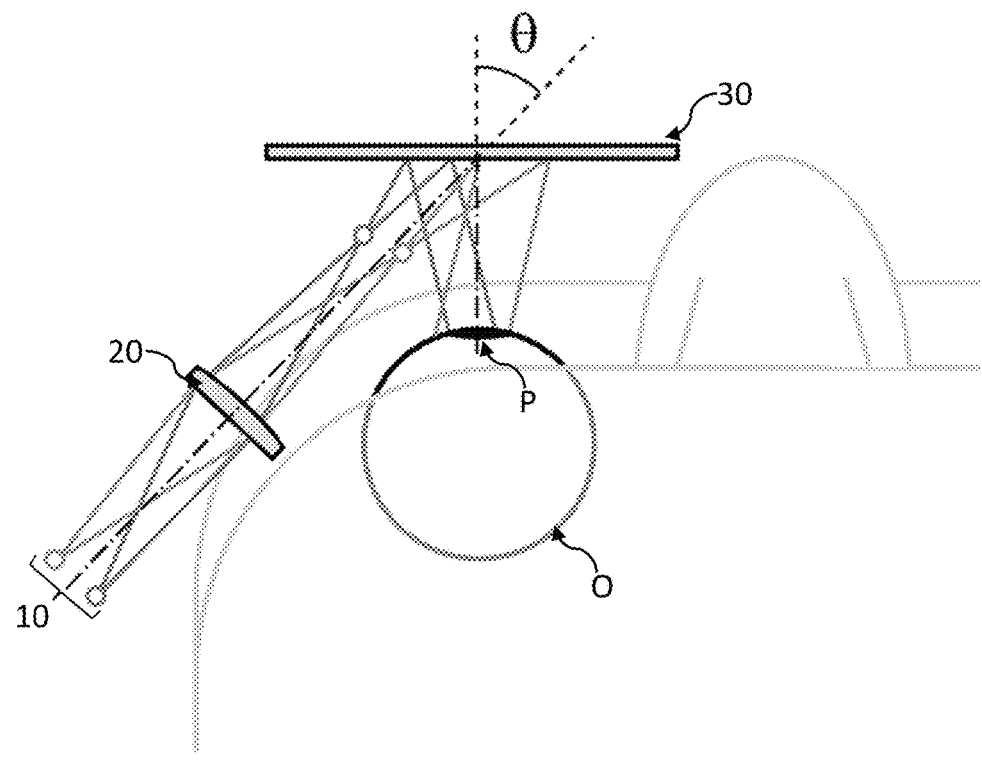

FIGS. 8C and 8D schematically show a second example of embodiment.

Figure 9:
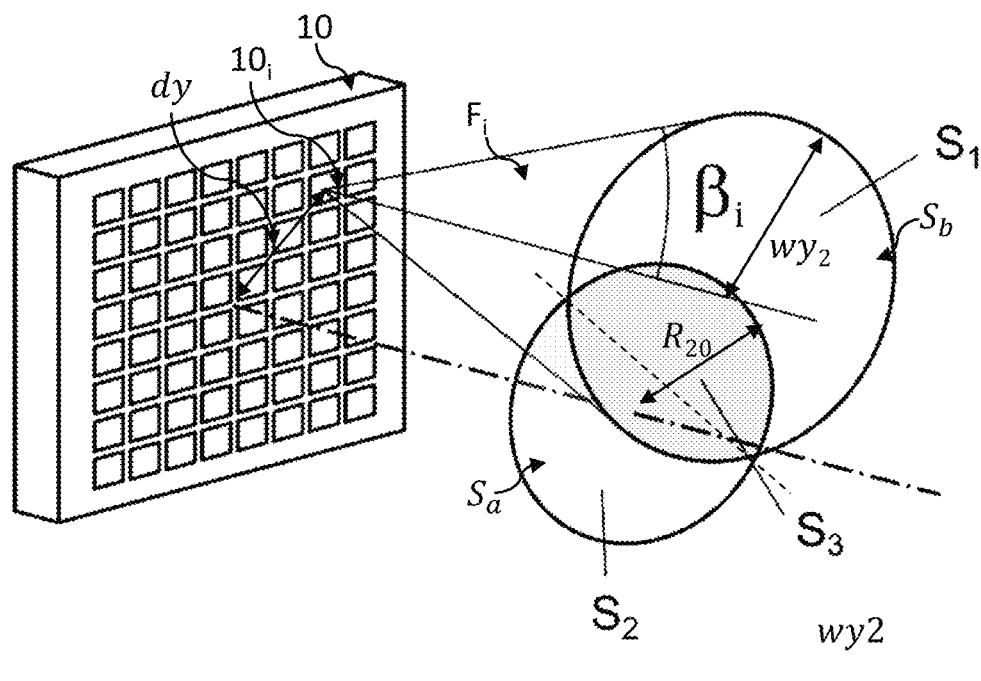

FIG. 9 illustrates collection, by a lens, of a beam emitted by a pixel of a directional screen.

Figure 10A:
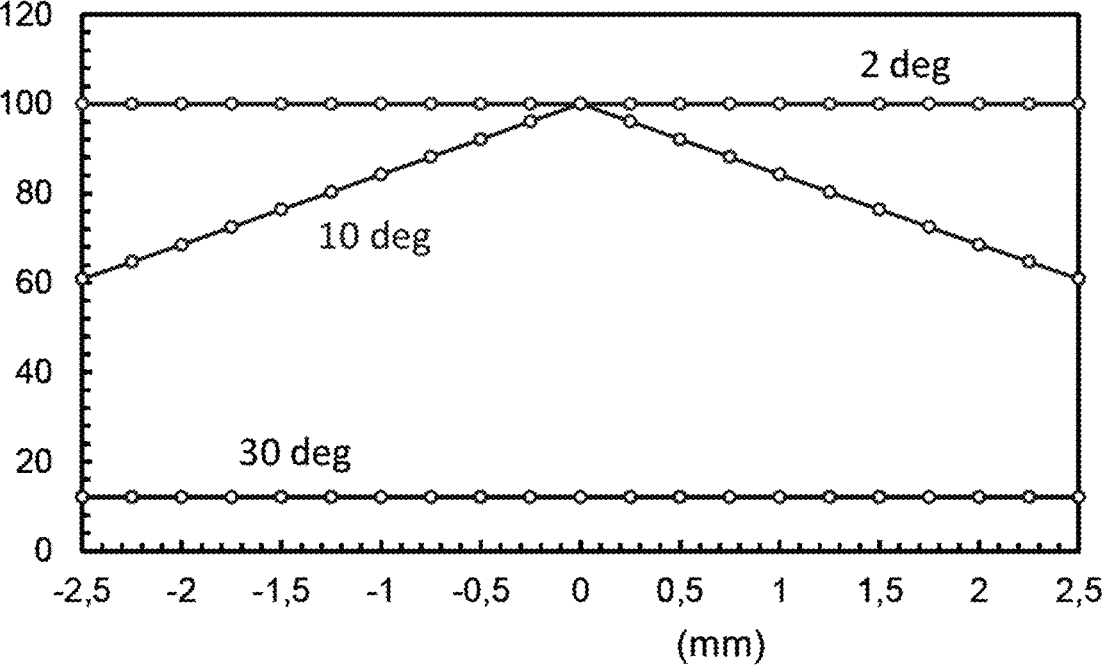

FIG. 10A shows efficacy (y-axis) as a function of the position of the pixels with respect to the optical axis (x-axis), for three angular divergence values.

Figure 10B:
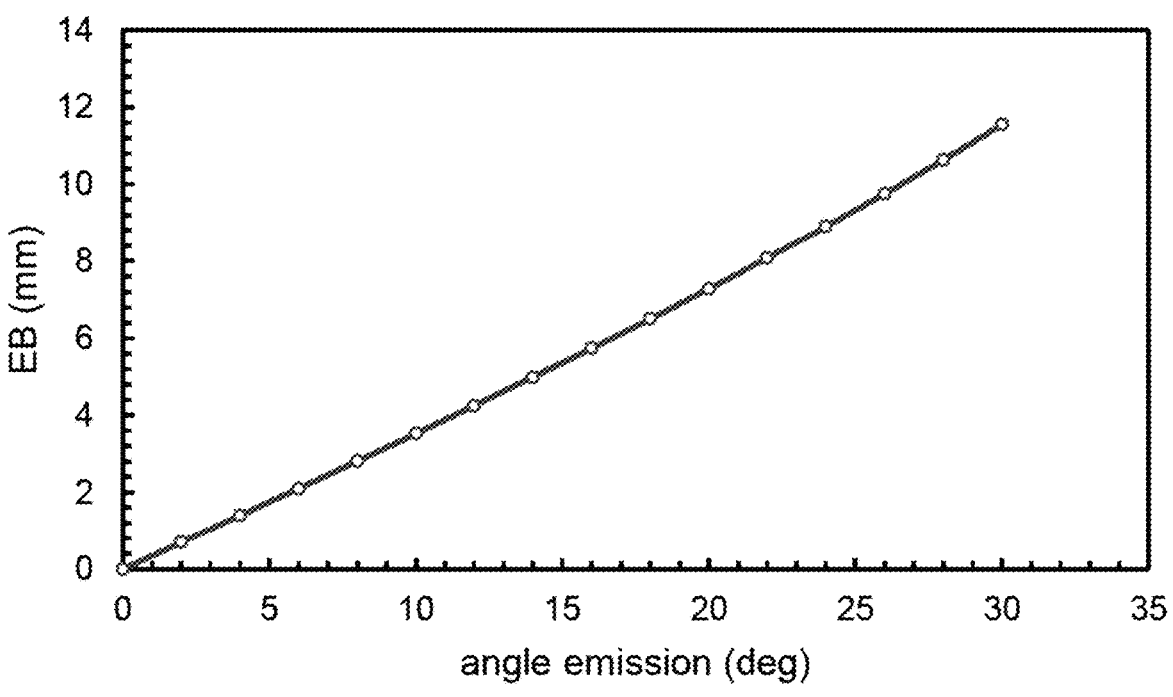

FIG. 10B shows the size of the eye-box formed by the device (y-axis) as a function of divergence angle.

Figure 11:
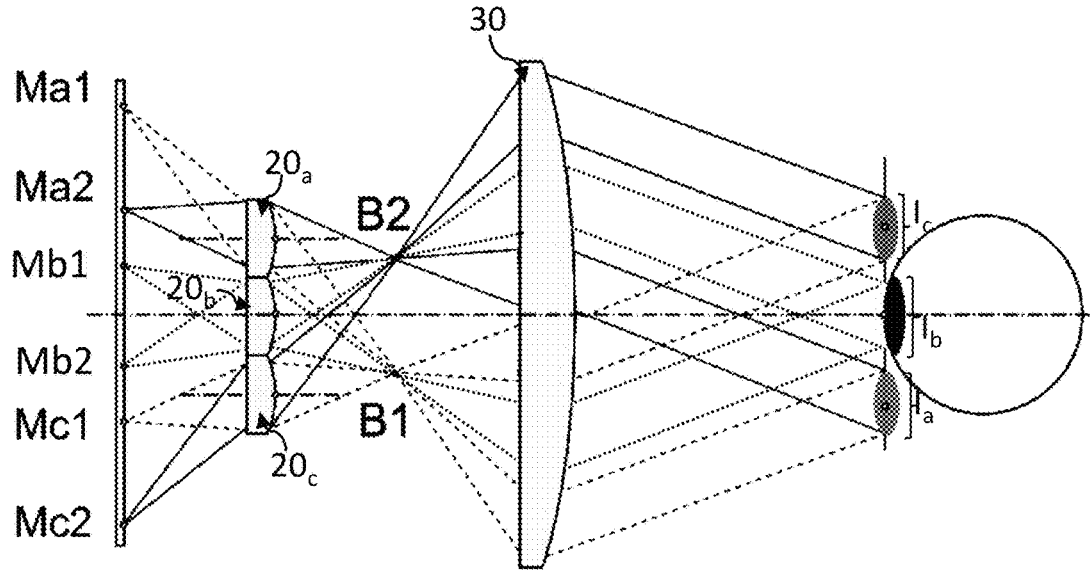

FIG. 11 shows a variant of a device, allowing the size of the eye box to be increased.

Figure 12:
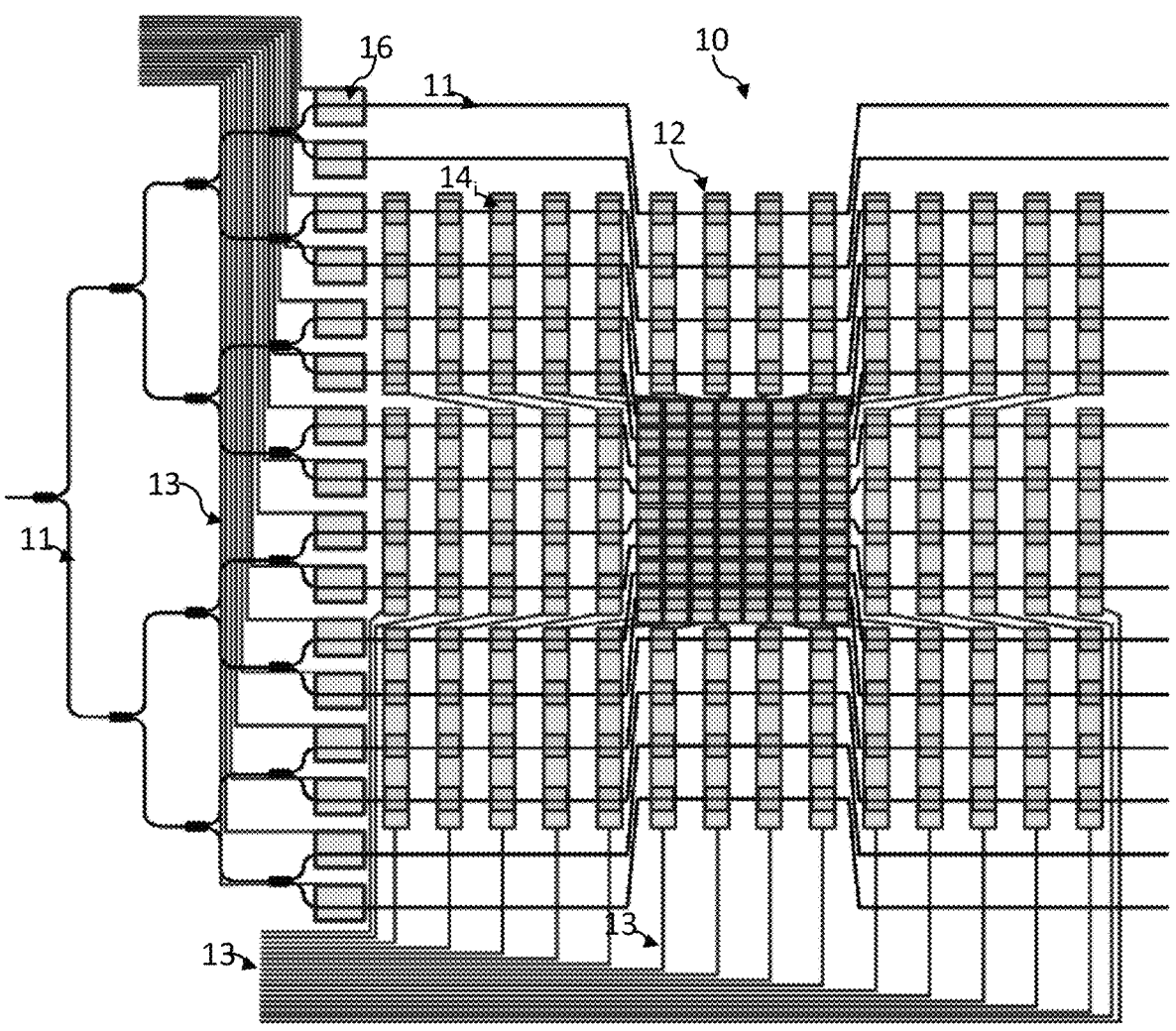

FIG. 12 shows a variant of a directional screen, comprising a high-resolution central part.

DESCRIPTION OF PARTICULAR EMBODIMENTS

Figure 1:
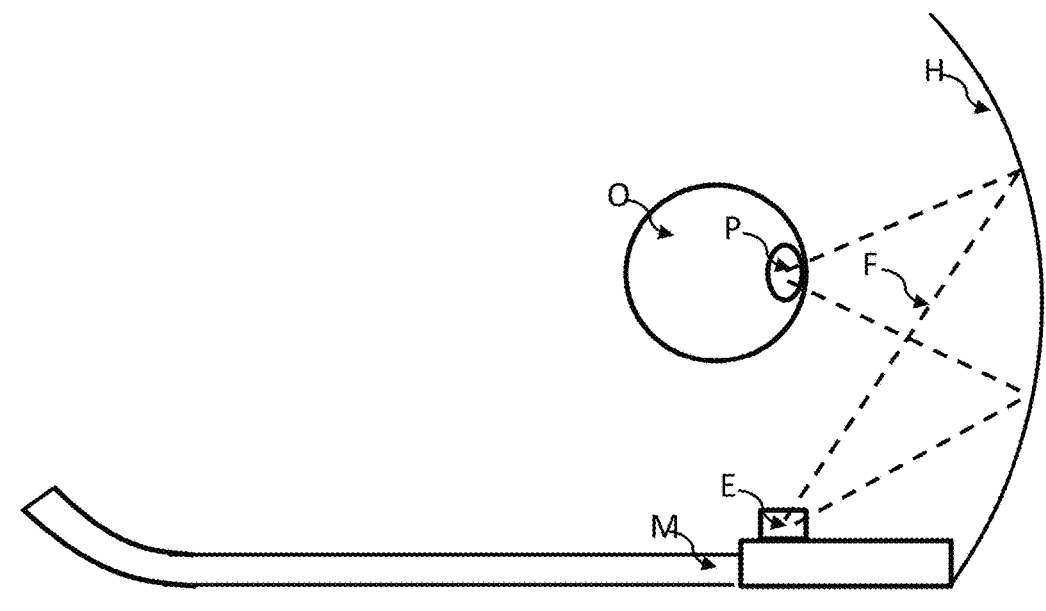
FIG. 1 shows a prior-art configuration.
Figure 2:
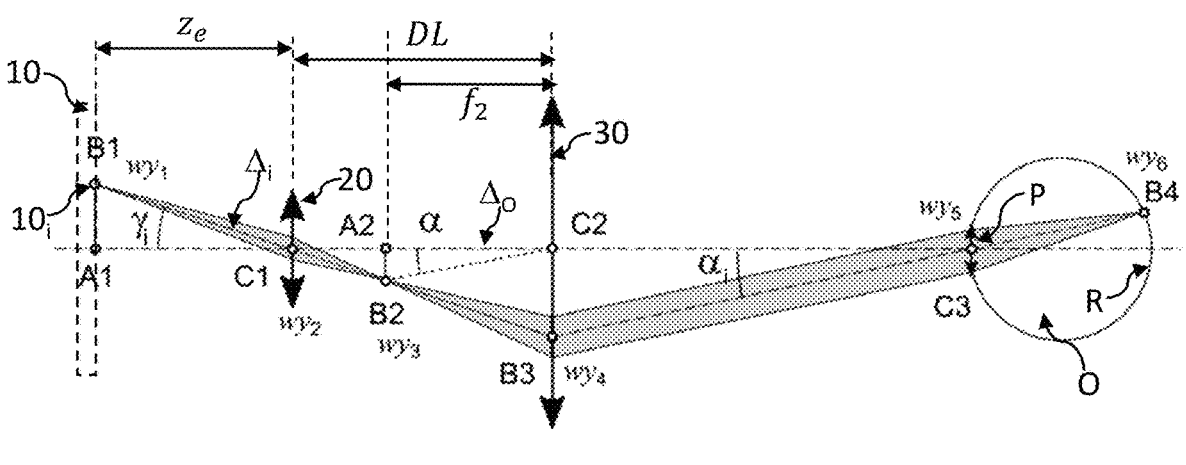
FIG. 2 is an optical schematic of a device according to the invention.

FIG. 2 schematically shows the main elements of a device 1 according to the invention. The device comprises a screen 10, comprising pixels $10_i$. Each pixel $10_i$ emits a divergent light wave, in an emission spectral band, that propagates along an emission axis $\Delta_i$. The emission axis $\Delta_i$ is inclined by an emission angle $\gamma_i$ with respect to a direction perpendicular to the screen. Advantageously, the screen 10 is a directional screen, such as described below. The respective emission spectral bands of each pixel may be identical or different from one another. For the sake of simplicity, FIG. 2 illustrates the operating principle in a plane, but the concept applies to a 3-dimensional device with pixels distributed in a matrix array and directions to be considered along two angles such as longitude and latitude.

The device comprises a combiner 30. The term combiner designates a component that combines both an optical function providing transparency, in a spectral band of transparency, and an optical function for steering, in a spectral band of interest, which is preferably narrow, and possibly for shaping an optical beam, generated off the viewing axis by the screen. The viewing axis corresponds to an axis centred on and perpendicular to the exit pupil. The combiner may perform, in one or each spectral band of interest, the optical function of mirror type and the forming function of convergent lens type. Outside these spectral bands, the component is transparent and the optical beams pass through it without notable disturbance.

FIG. 2 schematically shows an "unfolded" optical schematic, in which the combiner 30 is shown operating in transmission. Starting from a divergent incident light wave, the combiner 30 takes the form of a lens forming a collimated light wave, or one that may be considered as such, i.e. one that is weakly divergent. By weakly divergent, what is meant is a wave the divergence angle of which is less than 1°. This makes it possible to form, in the eye, an image "at a large distance", i.e. a distance of more than 2 m. Optical schematics in which the combiner operates in reflection will be described below, with reference to FIGS. 8B and 8D.

The combiner is configured to form, from each light wave emitted by a pixel, a collimated light wave that propagates towards the pupil of the eye of the user. Preferably, the combiner is a holographic combiner, the lens function and the mirror function being encoded in a hologram formed over the length of the combiner.

Use of a holographic combiner is known to those skilled in the art. A holographic combiner has the advantage of being compact, because it is formed by a thin holographic layer deposited on a carrier, such as lens of a pair of glasses. A holographic combiner is highly wavelength selective. The hologram is transparent to most of the visible spectrum, except for a specific wavelength to which it is sensitive. The convergence function of the combiner, and likewise the function ensuring angular deviation, are encoded into the hologram, as described below.

The device comprises a convergent lens 20, defining an object focal plane and an image focal plane. The convergent lens 20 is interposed between the screen 10 and the combiner 30. The screen 10 is placed in an object plane of the convergent lens 20. The convergent lens forms an image of the screen in an image plane, the latter corresponding to the object focal plane of the combiner. The lens 20 and the combiner 30 are centred on an optical axis $\Delta_0$ of the device. Use of the lens 20 makes it possible to move the screen away from the combiner. This facilitates integration of the device into a piece of equipment such as a pair of glasses or a virtual-reality headset.

In FIG. 2, the notations $wy_1$, $wy_2$, $wy_3$, $wy_4$, $wy_5$, $wy_6$ designate the beam sizes of the light wave emitted by pixel $10_i$, at the points B1, C1, B2, B3, C3 and B4 along the axis of propagation of the wave, respectively. The screen lies in an object plane passing through the point A1, with a normal vector coincident with or neighbouring the optical axis $\Delta_0$; by neighbouring, what is meant is within an angular tolerance of ±5°.

the lens 20 forms an image of the screen in an image plane, of normal vector neighbouring the optical axis $\Delta_0$;

the point C1 corresponds to the centre of the lens 20;

the point C2 corresponds to the centre of the combiner 30;

the point C3 corresponds to a position, called the central position, corresponding to the centre of the pupil P of an eye O of the user. When the user is using the device, he is supposed to centre her or his pupil on the central position. The point C3 also corresponds to the centre of the eye box formed by the device. The eye box corresponds to the range of movement that the pupil of the user is able to make, around the point C3, while still allowing the image displayed on the screen to be observed. The combiner is placed so as to conjugate the point C1 (centre of the lens, entrance pupil) with the point C3 (centre of the exit pupil).

the point B1 corresponds to the position of pixel $10_i$ of the screen 10;

the point B2 corresponds to the image of the point B1 as generated by the lens 20;

the point B3 corresponds to an intersection between the emission axis $\Delta_i$ and the combiner;

the point B4 corresponds to a point of the retina R that is conjugated with the point B1 by the system formed by the lens 20 and the combiner 30. $wy_6$ corresponds to the size of the beam at a pixel of the image formed, on the retina, by the device.

The points C1, C2 and C3 are aligned along the optical axis defined by the lens 20 and the combiner 30. The screen is in a plane of normal vector neighbouring the optical axis $\Delta_0$. Preferably, the point A1, which corresponds to the centre of the screen, is also on the optical axis $\Delta_0$, as shown in FIG. 2. The distance between the points C2 and C3 corresponds to an eye relief.

In a reflective configuration, the points C1, C2 and C3 are not aligned because the beam is folded by the combiner. See FIGS. 8B and 8D.

The screen 10 lies in a plane of normal vector neighbouring the optical axis $\Delta_0$ and passing through A1. As indicated above, an image of the screen 10 is formed, by the lens 20, in an image plane of normal vector neighbouring the optical axis $\Delta_0$ and passing through the point A2. The image plane is placed, or is sufficiently close to be considered to be placed, on the object focal plane of the holographic combiner 30.

The holographic combiner 30 is placed such that the image of the point C1, as generated by the holographic combiner, corresponds to the point C3, i.e. a position at which the user places the pupil P of her or his eye O. The collimated light wave, resulting from the combiner 30, propagates towards the pupil at an angle $\alpha_i$, which is called the apparent angle. The apparent angle $\alpha_i$ depends on the position of the point B1, i.e. of pixel $10_i$.

Thus, for each pixel $10_i$ of the screen 10, the optical system formed by the lens 20 and the combiner 30 defines an angle $\alpha_i$ at which the light wave emitted by the pixel and collimated by the combiner 30 reaches the pupil of the user. The apparent angles $\alpha_i$ determined for two different pixels are different.

The collimated light wave resulting from the combiner is focused by the eye so as to form a pixel of an image of the screen, which image is formed on the retina R of the eye. The pixel of the image formed on the retina corresponds to point B4. The position of B4 is defined by the apparent angle $\alpha_i$, the latter being different for each pixel $10_i$. It will be understood that the device allows the image formed by the screen 10 to be formed on the retina R.

The combiner makes it possible to generate a wave that is collimated at the eye so that when the user looks at a faraway object (eye/object distance large with respect to the size of the eye), for example the peak of a mountain, the user may also perceive the image of the screen, the latter generating information of augmented-reality type, for example the name of the peak and its altitude. The notion of collimation is therefore relative. Although theoretically associated with an image placed at infinity, this notion may also be applied to an image placed at a large distance (typically beyond 100 times the size of the eye, i.e. about 2 metres from the observer). The device illustrated in FIG. 2 may be fixed, its configuration being set by the distances between the screen and the optics (lens 20 and combiner 30). The image projected into the eye represents the screen as though it were at infinity. Advantageously, it is possible to make the device dynamic by moving the screen in the object plane of the lens or by using a lens 20 of variable focal length. This makes it possible to adjust the accommodation distance.

Preferably, the screen 10 is a directional screen. The term directional screen designates a screen each pixel of which is configured to emit a divergent light wave along an emission axis, making an emission angle to a direction normal to the screen, the light wave propagating such as to make a divergence angle to the emission axis, the screen being such that:

the divergence angle is predetermined, and preferably less than 45° or less than 30°;

and/or the emission axes of two different pixels are different;

and/or the divergence angles of two different pixels are different;

and/or at least one emission axis of a pixel is inclined with respect to the direction normal to the screen.

The emission axis of the pixel $10_i$ is oriented towards the centre of the lens 20. Thus, each pixel $10_i$ of the screen 10 is configured to emit a light wave, around an emission axis $\Delta_i$ the emission angle $\gamma_i$ of which is such that the emission axis $\Delta_i$ passes through the C1 of the lens 20. As a result, the respective emission angles of various pixels $10_i$ are different from one another and converge to the centre C1 of the lens 20.

FIGS. 3A and 3B show operation of the directional screen 10. The directional screen is formed by a plurality of pixels $10_i$, which are preferably arranged in rows and columns. Each pixel is configured to emit a light wave at an emission angle, with respect to a direction D normal to the plane in which the screen lies. In FIG. 3A, the following have been shown:

a pixel $10_1$, emitting a divergent light wave propagating along an axis of propagation making an emission angle $\gamma_1$ to the direction D, and forming a cone the half-angle at the apex of which is denoted $\beta_1$ and called the divergence angle;

a pixel $10_2$, emitting a divergent light wave propagating along an axis of propagation making an emission angle $\gamma_2$ to the direction D, and making a divergence angle $\beta_2$.

FIG. 3B schematically shows a structure of the directional screen. The directional screen comprises light guides 11. Each light guide 11 is connected to one light source $11_{in}$. Unlike the configuration described in U.S. Pat. No. 9,632, 317, the light source $11_{in}$ may be a laser source, but also a non-coherent source, for example a light-emitting diode. In the example shown, each light guide extends along a row, and more precisely over the length of various pixels of the row. The light guides may for example be formed from SiN (silicon nitride), deposited in a layer of $SiO_2$.

The screen comprises:

a first layer, in which light guides 11 are formed. The light guides are configured to receive light emitted by the light source $11_{in}$;

a second layer, in which diffraction gratings 12 are formed, such that each diffraction grating 12 is coupled to one light guide 11. The diffraction gratings 12 are electrically modulated. Each diffraction grating 12 corresponds to a periodic variation in refractive index, capable of being electrically modulated. The diffraction gratings 12 coupled to a given light guide 11 are spaced apart from one another over the length of the light guide, and are considered to be discrete. Each diffraction grating 12 may be formed from inclusions, defining a periodic pattern, in silicon oxide ($SiO_2$), each inclusion being formed from a material the refractive index of which is electrically modulatable, for example a liquid crystal. When the wavelength of the light is 532 nm, the period of the pattern of the diffraction grating 12 may be comprised between 200 nm and 500 nm. A diffraction grating may be made up of 10 periodic patterns, and thus extend over a length of 2 or 5 μm;

a third layer, in which transparent electrodes 13 are formed, the electrodes being configured to electrically modulate the refractive index of a material forming the diffraction gratings. The transparent electrodes may be formed from a transparent conductive material, for example ITO (indium tin oxide). Each electrode may thus activate one diffraction grating under the effect of electrical modulation. In the example shown, the transparent electrodes extend parallel to columns;

a fourth layer, referred to as the holographic layer, corresponding to a holographic film 14. By holographic film, what is meant is a photosensitive medium capable of recording a hologram. The holographic film is assumed to be thin enough to be likened to the emission surface. The holographic film may be a photopolymer of photoresist type or a suspension of light-sensitive compounds such as silver halide.

The layers are formed on a transparent carrier. It may for example be a carrier made of glass or of polycarbonate.

Under the effect of biasing by an electrode 13, each discrete diffraction grating 12 is activated, in the sense that it allows some of the light propagating through a light guide 11 to which the diffraction grating 12 is coupled to be extracted. The extracted light propagates towards the holographic film 14, and more precisely towards an elementary region $14_i$ of the holographic film 14. Under the effect of illumination, the elementary region of the holographic film emits a light wave with predefined angular characteristics. By angular characteristics, what is meant is an emission angle $\gamma_i$ and a divergence angle $\beta_i$.

Thus, each pixel $10_i$ of the screen corresponds to a superposition of a discrete diffraction grating 12 coupled to a light guide 11, and of an electrode 13, facing an elementary region $14_i$ of the holographic film 14. The association between each electrode 13 and each diffraction grating 12 forms a structure for extracting some of the light propagating through a light guide 11.

In the example shown, the light guides 11 are coplanar. The same goes for the electrodes 13. Thus, the electrodes 13 are superposed on the light guides 11. Each electrode "crosses" a plurality of light guides, so as to define a plurality of intersections, each intersection corresponding to one pixel of the screen. The term "to cross" is to be understood to designate a superposition of an electrode and of a light guide. The position of each pixel is defined by positioning the light guides and the electrodes. The angular emission characteristics are defined by the hologram forming the elementary region $14_i$, which is illuminated by extracting light propagating through the light guide.

FIG. 3B shows a pixel $10_2$ and a pixel $10_4$. Each elementary region of the hologram facing these pixels is configured to emit a respective light wave with predefined angular characteristics, which are encoded into the hologram. FIG. 3B shows the emission angles $\gamma_2$ and $\gamma_4$ defined for the pixels $10_2$ and $10_4$. The angular emission characteristics may be defined, for each pixel, independently of the other pixels.

Splitters 11', Y-junctions for example, may be placed so as to distribute the light emitted by a given light source $11_{in}$ to various light guides 11. In order to modulate the intensity of light propagating through a light guide, each light guide 11 may be coupled to a modulator. FIG. 3B shows four modulators M1, M2, M3 and M4. Each modulator comprises an extractor 16, which is configured to be electrically activatable, so as to extract all or some of the light propagating through a light guide. Each extractor may be similar to a diffraction grating 12 such as described above. When an extractor is activated, the light propagating through the light guide 11 is extracted, and preferably to an absorber 17. The presence of the absorber makes it possible to dissipate the extracted light, in order to avoid propagation of a stray light through the screen 10. Use of modulators allows the intensity of pixels of the screen that are activated simultaneously to be adjusted.

The angular emission characteristics of each pixel $10_i$ are defined in a prior phase of recording the holographic film 14. As known, a hologram is formed by interference between two light waves emitted by the same light source: an object light wave and a reference light wave. The interference fringes generated are physically or chemically memorized in the holographic film 14. FIG. 4 shows an arrangement allowing an elementary region $14_i$ of the holographic film 14 to be recorded.

A light source is coupled to two fibres by means of a splitter, so as to obtain a fibre forming an object beam 42 and a fibre forming a reference beam 41. The light source has a wavelength close to that of the light $11_{in}$ to which the screen 10 is connected when in use. This source is typically a laser of long coherence length (longer than one metre).

The fibre forming the reference beam 41 reproduces illumination conditions similar to those obtained by extracting light from a light guide 11 by activating a diffraction grating 12. By illumination conditions, what is meant is the angle of incidence of the beam, its size and its divergence. The reference beam 41 is fixed and is formed by a reference beam-forming optical system 43.

The object beam is generated by an object beam-forming optical system 44 coupled to a convergent focusing optical unit 45. This makes it possible to adjust an angle of incidence $\gamma_i$ and a divergence angle $\beta_i$ of the object beam. A hologram is recorded, in an elementary region $14_i$, by simultaneously exposing said elementary region to the object beam and to the reference beam. The various holograms are produced, in each elementary region, by moving the holographic film 14 and optionally modifying the characteristics of the object beam, in particular the angle of incidence $\gamma_i$ and the divergence angle $\beta_i$. Thus, each elementary region $14_i$ is assigned an angle of incidence $\gamma_i$ and a divergence angle $\beta_i$ that correspond to the angle of incidence and divergence angle of the object beam during recording of the hologram.

FIGS. 5A to 5D schematically show various layers mentioned above. FIG. 5A shows, formed on a glass substrate 15, a structured layer defining the light guides 11. FIG. 5B shows an extraction layer formed by the diffraction gratings 12, 16 described above. FIG. 5C shows a holographic layer comprising the holographic elementary regions $14_i$ and the absorber 17.

One advantage of the holographic screen is that it reduces the number of light sources with respect to the configuration described in U.S. Pat. No. 9,632,317. The directional screen may be formed using a single light source. It is then monochrome. The directional screen may be formed using a plurality of light sources emitting in different spectral bands. Such a configuration is shown in FIG. 5D. A plurality of light guides may be formed, on the same layer, so as to form independent arrays of light guides. Each light-guide array is intended to be optically coupled to a light source emitting in a determined spectral band. FIG. 5D shows two light-guide arrays intended to be optically coupled to two light sources $11_{in1}$ and $11_{in2}$. The various light guides may be produced on the same substrate 15. The arrangement of the light guides prevents cross-talk between the light guides at each intersection.

Figure 6A:
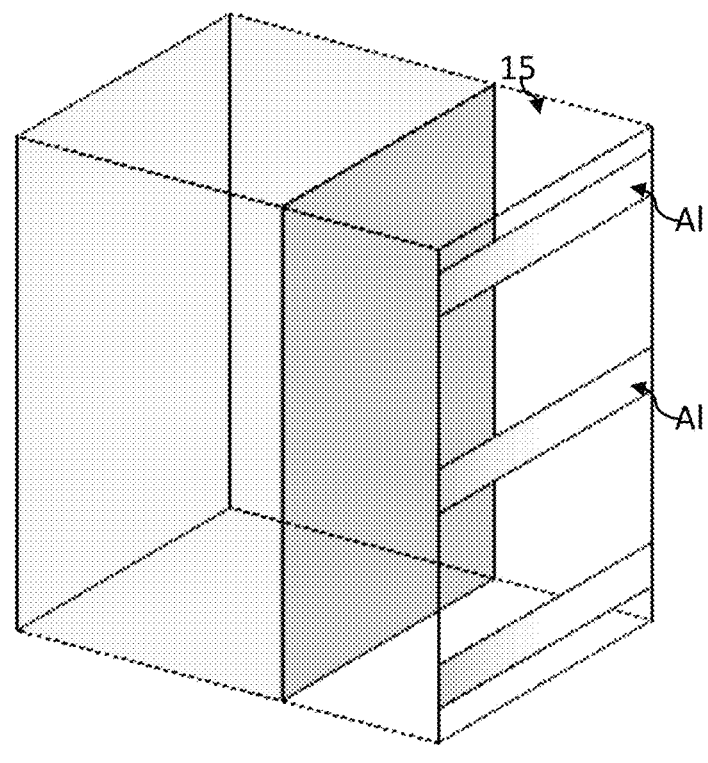

FIGS. 6A to 6F illustrate the steps of manufacture of a directional screen 10. In FIG. 6A, strips of reflective material (for example a metal such as aluminium Al), which are intended to act as a reflector, are deposited on a substrate 15, thereby forming rows. The aluminium strips, which are 1 μm wide, are spaced apart from each other by 5 μm.

FIG. 6B shows a layer of addressing electrodes 13, taking the form of a structured layer of ITO (indium-tin oxide) of 40 nm thickness. The ITO layer may be structured so as to form electrodes extending in columns, perpendicular to the rows.

FIG. 6C shows deposition of an $SiO_2$ layer, in which light guides 11 made of SiN are formed. The guides have a width of about 400 nm and a thickness of between 100 nm and 400 nm. The choice of SiN is justified by its transparency in the visible domain.

Figure 6D:
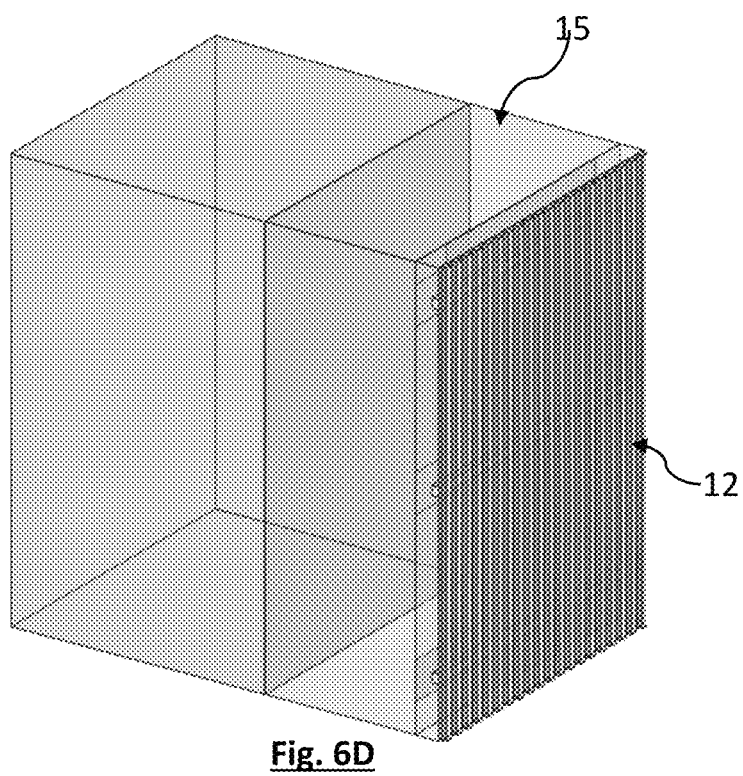
Figure 6E:
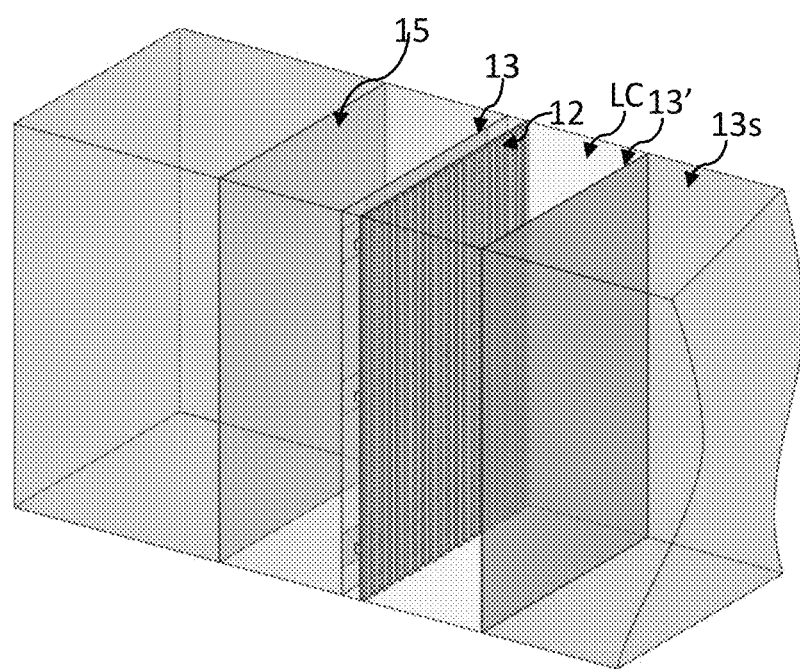

FIG. 6D shows deposition of a structured layer intended to form a diffraction grating 12. The diffraction grating is preferably formed from a material that is simple to structure, a sol-gel for example.

The diffraction grating is encapsulated in a liquid-crystal layer LC, the refractive index of which is able to switch between two values depending on the voltage applied by the electrodes. Depending on the value of the refractive index, the diffraction grating 12 allows light propagating through the light guide to be extracted. A transparent counter-electrode 13', for example one made of ITO deposited on a transparent film 13s (made of glass or of transparent plastic), is placed on the liquid-crystal layer. See FIG. 6E.

Figure 6F:
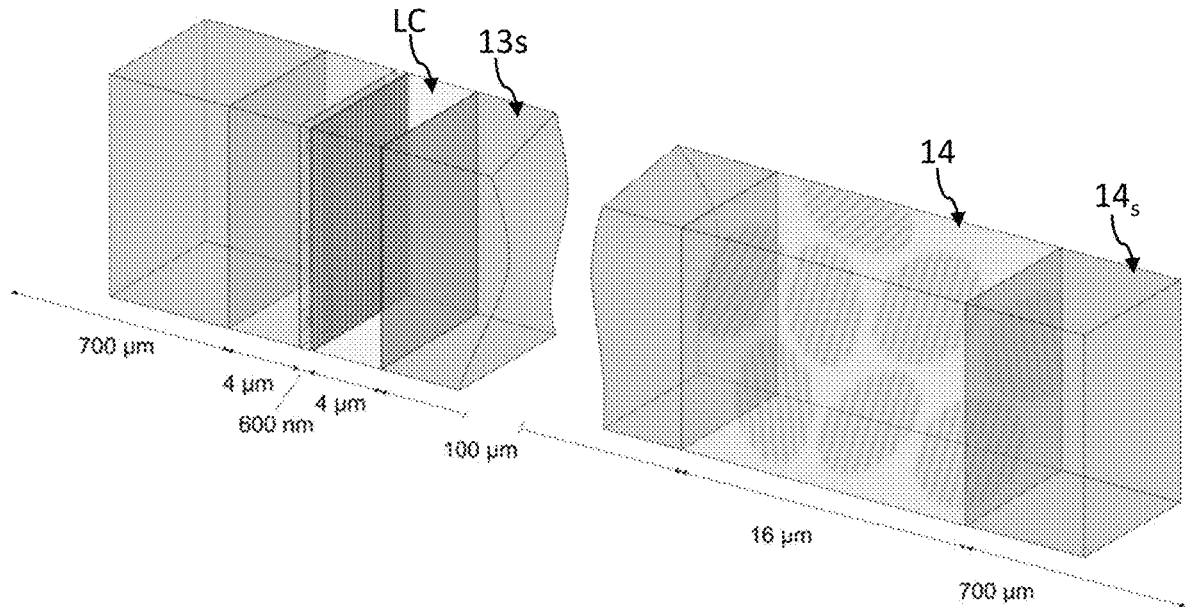

FIG. 6F shows deposition of a holographic layer 14, borne by a transparent carrier 14s, against the film 13s allowing the liquid crystal to be encapsulated. The holographic layer 14 may be formed from a photopolymer, of 15 μm thickness, while the carrier 14s may be formed from glass, of 700 μm thickness. The holographic layer 14 will have undergone recording beforehand, as described with reference to FIG. 4.

FIG. 6F shows all the layers forming the directional screen 10. The total thickness is of the order of 1.5 mm. The area of each pixel may be 5 μm×5 μm. It is thus possible to form a screen of 1920×1080 resolution the area of which is 10 mm×5 mm.

The configuration illustrated in FIG. 2 works regardless of the type of screen. However, optimum performance is obtained using a directional screen such as described above. More precisely, it is advantageous for each pixel of the screen that contributes to the image formed on the retina to emit a light wave along an emission axis passing through the centre of the lens 20. Thus, the emission angles assigned to each pixel are adjusted so as to converge to the centre of the lens 20. This allows the amount of light forming the image on the retina to be increased.

FIG. 7A details operation of a convergent lens. In FIG. 7A, the lens conjugates point A' with point A. The points F and M belong to the object focal plane. The light waves emitted by the points F and M are deflected to infinity by the lens. The point F corresponds to the focus of the lens. The point M is offset from the point F in the object focal plane. On exiting the lens, the beams passing through points F and M, respectively, are collimated and deviated angularly with respect to each other.

FIG. 7B illustrates a phase of recording a hologram on the holographic combiner. An elementary region of the holographic material, forming the combiner, is exposed to a divergent reference beam F1, which is emitted from a point F, and to a collimated object beam F2, both beams being emitted by the same light source. The light source used, for example a laser source, is preferably coherent, and emits in a recording spectral band. The hologram resulting from the interference between the beams F1 and F2 is stored in the holographic material. FIG. 7C shows use of the holographic combiner: under the effect of exposure to a divergent light beam F3 emitted from the point F, which corresponds to the focus of the lens, the previously stored hologram reflects a collimated light beam F4. If the beam F3 is emitted from a point A, distant from the focus F, the combiner reflects a convergent beam to a point A'.

In the example illustrated in FIGS. 7B and 7C, the holographic combiner forms a holographic lens reflecting light at the wavelength of the beams F1 and F2. This makes it possible to form a holographic reflector that is suitable for the reflective configurations illustrated in FIGS. 8B and 8D. The holographic combiner operates only in a narrow spectral band, which corresponds to the recording spectral band. Outside this spectral band, the holographic combiner transmits light. The holographic combiner may be placed on a lens of a pair of glasses or on a visor of a virtual-reality headset.

FIGS. 8A and 8B show a first example of embodiment, in an unfolded and folded configuration, respectively. The design parameters are:

eye relief (ER), which corresponds to the distance between the refractive medium closest to the eye, in the present case the combiner 30, and the eye: 30 mm;

distance between the screen 10 and the lens 20: $z_e$=16 mm;

focal length of the lens 20: $f_1$=10 mm;

focal length of the combiner 30: $f_2$=18 mm;

screen size: 5 mm×5 mm;

field of view: FOV=26°.

Definition of these parameters allows the distance DL between the lens 20 and the combiner 30 to be set:

$$DL = \frac{z_e \times f_1}{z_e - f_1} + f_2$$

a distance DL=44.667 mm is computed.

The field of view (FOV) is determined via the following relationship:

$$FOV = 2\alpha_{max} = 2 \times \tan^{-1}\left(\frac{d_e}{2 \times f_2 \times z_e} \times (DL - f_2)\right)$$

where $\alpha_{max}$ is the apparent angle of the pixel of the screen furthest from the optical axis.

An FOV=26° is computed.

If it is desired to modify the accommodation plane, this may be done by modifying the optical parameters of the system actively. The accommodation distance $Z_{ac}$ is determined, it is given by the formula:

$$Z_{ac} = \frac{[(f_1 - z_e) \times D_L + z_e \times f_1] \times f_2}{z_e \times f_1 + (D_L - f_2) \times (f_1 - z_e)} + ER$$

The accommodation distance $Z_{ac}$ may be varied by modifying $z_e$ (distance between screen and lens 20) or by modifying the focal length $f_1$, using a lens 20 of variable focal length.

To pass from an accommodation distance of infinity to $Z_{ac}=2$ m, the screen must be moved from a distance of 16 mm to 15.94 mm, which corresponds to a movement of 60 µm. Such a movement may be obtained by using a translational holder, for example a motorized or piezoelectric holder, allowing the screen to be translated with respect to the lens, along the optical axis. The same effect is obtained with a lens 20 the focal length of which varies from 10 mm to 10.022 mm.

FIG. 8B shows a reflective configuration, in which the combiner acts as a reflector. Such a configuration, with a large eye relief (30 mm), is more suitable for mounting on a mixed-reality headset. Since the reflector is transparent, except at wavelengths to which the holograms are sensitive, it transmits an image Is of a scene propagating towards the eye of the user. The combiner may also be opaque to address virtual-reality applications. The combiner then forms an optical reflector that may consist of a holographic component such as described above, or of a "free form" mirror the curvature of which makes it possible to obtain the desired convergence effect. The angle θ corresponds to a folding angle. In this example, θ=32°. In this reflective embodiment, use of a holographic combiner is particularly advantageous.

FIGS. 8C and 8D schematically show a second example of embodiment, in a transmissive and reflective configuration, respectively, with the following parameters:

eye relief (ER): 15 mm;
    distance between the screen 10 and the lens 20: Ze=20 mm;
    focal length of the lens 20: f1=10 mm;
    focal length of the combiner 30: f2=10 mm;
    screen size: 5 mm×5 mm;
    field of view: FOV=28°.

In this configuration, DL is set so that DL=30 mm. To pass from an accommodation of infinity to Zac=2 m, the screen-lens distance must be modified from 20 mm to 19.95 mm.

This configuration is more compact than the one described with reference to FIGS. 8A and 8B. The eye relief is 15 mm, which is suitable for integration into a piece of equipment such as a pair of glasses. FIG. 8D shows a reflective configuration, with a folding angle of θ=45°.

The configuration schematically shown in FIG. 2, and examples of which have been given with reference to FIGS. 8A to 8D, is able to operate with any type of screen. Use of a directional screen is advantageous because it allows the luminous efficacy of the device to be increased. As described above, the emission of each pixel 10$_i$ is parameterized by angular characteristics $\gamma_i$ and $\beta_i$. It was established above that it is preferable for the emission angle $\gamma_i$ to be such that the emission axis of each pixel passes through the centre of the lens 20. The divergence angle $\beta_i$ may be optimized, so as to increase the luminous efficacy of the device.

FIG. 9 shows a uniform beam $F_i$ emitted by a pixel 10 the emission angle of which is oriented in a direction perpendicular to the surface of the screen. The beam is distributed, in the plane formed by the lens 20, in a disk of area $S_1$ and of radius $wy_2$ (cf. FIG. 2). $S_2$ corresponds to the area of the lens 20, which is of radius $R_{20}$. $S_3$ corresponds to the intersection of $S_1$ and of $S_2$. $S_3$ must be as large as possible so as to optimize collection, by the lens 20, of the beam emitted by the pixel. An efficacy ρ may be defined, such that:

$$\rho = \frac{S_3}{S_1} \tag{1}$$

The efficacy ρ may be calculated geometrically, by defining:

$$d = \frac{wy_2 + dy^2 - R_{20}^2}{2dy} \tag{2}$$

$$d' = dy - d \tag{3}$$

Let $S_a$ and $S_b$ be the parts of the areas $S_2$ and $S_1$ bounded by the dashed line shown in FIG. 9, respectively.

$$S_a + S_b = S_1 + S_2 - S_3 \tag{4}$$

$$S_a = wy_2^2 \times \cos^{-1}\left(\frac{d}{wy2}\right) - d\sqrt{wy_2^2 - d^2} \tag{5}$$

$$S_b = R_{20} \times \cos^{-1}\left(\frac{d'}{R_{20}}\right) - d'\sqrt{R_{20}^2 - d'^2} \tag{6}$$

$$\rho = \frac{S_3}{\pi wy_2^2} \tag{7}$$

$$\text{and: } wy_2 = Z_e \tan(\beta_i) \tag{8}$$

$Z_e$ is the distance between the lens 20 and the screen 10.

Efficacy ρ was calculated using expression (7), considering three values of $\beta_i$: 2°, 10° and 30°. FIG. 10A shows the value of the efficacy (y-axis) as a function of a distance of the pixels from the centre of the screen. It may be seen that, for a divergence of 10°, the efficacy is optimal only for the pixels in the centre of the screen. Since emission angle is not controlled, efficacy drops as the pixels get further from the centre of the screen.

When the divergence angle is 2°, 100% efficacy is obtained for pixels located around the centre of the screen. This corresponds to a configuration in which the area $S_2$ is small and contained in the area $S_1$.

The smaller the divergence angle, the better the efficacy. This confirms the advantage of using a weakly divergent, directional screen to implement the invention. By weakly divergent, what is meant is that the divergence angle of each pixel is less than 20°, and preferably less than 15° or 10°. It is recalled that the divergence angle is the half-angle at the apex of the emission cone of the pixel.

In addition to efficacy, another performance indicator is the size of the eye box, which also depends on the divergence angle. Specifically, the side length EB of the eye box is such that:

$$EB = 2wy_5 = 2\frac{f_2(Z_e - f_1)}{f_1}\tan(\beta_i) \tag{9}$$

where $f_1$ and $f_2$ are the respective focal lengths of the lens 20 and of the combiner 30.

FIG. 10B shows the dimension EB of one side of the eye box (y-axis—unit mm) as a function of the angle $\beta_i$ (x-axis—unit degrees). It may be seen that the larger the divergence, the larger the size of the eye box, this making the device more comfortable to use. When the angle $\beta_i$ of each pixel is equal to 11°, the eye box has a side length of 4 mm, this being acceptable. In FIG. 10A, it may be seen that if the directivity of emission of the pixels is not suitably controlled, a divergence angle of 10° causes a decrease in the efficacy of the pixels placed on the periphery of the screen 10 of 40%. According to the present invention, if directivity is controlled so as to target the centre of the lens 20, an efficacy close to 100% is obtained for all the pixels while keeping a reasonably sized eye box.

FIGS. 11 and 12 illustrate variants of embodiment. FIG. 11 shows a configuration in which the lens 20 is formed by a plurality of convergent elementary lenses 20a, 20b and 20c that are coplanar and aligned perpendicular to the optical axis $\Delta_0$. Each lens is optically coupled to one group of pixels of the screen, these pixels being associated with said lens. The pixels associated with a lens have an emission axis converging to the centre of said lens. In FIG. 11:

the pixels located between the points Ma1 and Ma2 are associated with the elementary lens 20a: they form a first sub-screen;

the pixels located between the points Mb1 and Mb2 are associated with the elementary lens 20b: they form a second sub-screen;

the pixels located between the points Mc1 and Mc2 are associated with the elementary lens 20c: they form a third sub-screen;

In this configuration:

the pixel placed at the point Ma1 is imaged, by the lens 20a, at the point B1;

the pixel placed at the point Ma2 is imaged, by the lens 20a, at the point B2;

the pixel placed at the point Mb1 is imaged, by the lens 20b, at the point B1;

the pixel placed at the point Mb2 is imaged, by the lens 20b, at the point B2;

the pixel placed at the point Mc1 is imaged, by the lens 20c, at the point B1;

the pixel placed at the point Mc2 is imaged, by the lens 20c, at the point B2;

This configuration makes it possible to form, on the pupil, three images $I_a$, $I_b$, and $I_c$, corresponding to the pixels Ma1 to Ma2, Mb1 to Mb2, Mc1 to Mc2, respectively. The screen is then segmented into three sub-screens, each sub-screen being associated with one lens. The pixels of a given sub-screen allow three images to be formed. If the three groups of pixels have the same content, the images $I_a$, $I_b$, and $I_c$ are identical. Such a configuration allows the eye box to be duplicated, so as to increase the possible range of movement of the eye.

FIG. 12 illustrates a variant in which the spatial pitch, separating two adjacent pixels, varies. More precisely, the screen is segmented into a central part, containing 8×8 pixels, encircled by a peripheral part. The spatial pitch is small in a central part of the screen, compared to the spatial pitch separating adjacent pixels in the peripheral part. This improves the spatial resolution of the part of the screen seen by the fovea, which is a central region of the retina that has an angular radius of up to 3° or 5°. In the fovea, the spatial resolution of the eye is particularly high. Such a screen, which is referred to as a foveated screen, matches the variation in the spatial resolution of the eye.

The invention claimed is:

1. A device for projecting an image onto an eye, the device comprising:

a light emitter, configured to emit light waves along various respective emission axes;

an optical combiner, optically coupled to the light emitter, and configured to form, from each light wave emitted by the light emitter, a collimated light wave that propagates towards a pupil of the eye;

wherein:

the light emitter comprises a directional screen, comprising various pixels, each pixel being configured to emit a divergent light wave that propagates around an emission axis of the pixel, the various pixels emitting respective divergent light waves that propagate along various emission axes, respectively, each light wave propagating such as to make a divergence angle of the pixel to the emission axis of the pixel;

the optical combiner is configured to receive each light wave emitted by a pixel and to form a collimated light wave that propagates towards a central position corresponding to the centre of the pupil of the eye;

the device comprises a convergent lens interposed between the directional screen and the optical combiner, the convergent lens extending around a centre, the centre of the lens forming, with a centre of the combiner, an optical axis of the device;

wherein the image of the directional screen, as generated by the convergent lens, is formed in an object focal plane of the optical combiner;

the image of the centre of the convergent lens, as generated by the combiner, is formed at the central position;

so that the collimated light wave, resulting from the combiner, reaches the central position at an angle dependent on the position of the pixel of the screen;

and wherein the respective emission axes of the pixels converge to the centre of the convergent lens.

2. The device of claim 1, wherein the screen comprises a stack comprising:

light guides, each light guide being coupled to a plurality of diffraction gratings, which are distributed over the length of the light guide, each diffraction grating being electrically modulatable, each diffraction grating being configured to be electrically modulated so as to extract light propagating through the light guide;

electrodes, each electrode being associated with a plurality of diffraction gratings coupled to various light guides, respectively, each electrode being configured to modulate each diffraction grating with which it is associated;

wherein:

each pixel of the screen corresponds to an association between an electrode and a diffraction grating coupled to a light guide;

when illuminated by light extracted from the light guide, each pixel is configured to emit a divergent light wave that propagates around the emission axis of the pixel, thereby forming an emission cone, defined by the divergence angle of the pixel around the emission axis of the pixel.

3. The device of claim 2, wherein the screen comprises a holographic film, which is subdivided into various elementary zones, each elementary zone being associated with the diffraction grating of one pixel, and configured to emit the divergent light wave, along the emission axis and at the divergence angle of the pixel, under an effect of light extracted by the diffraction grating with which it is associated.

4. The device of claim 2, wherein:

a plurality of light guides are connected to the same light source;

a light modulator lies between the light source and each light guide, so as to modulate an intensity of the light emitted by the light source and fed to each light guide.

5. The device of claim 2, comprising a plurality of light sources, each light source being optically connected to a plurality of light guides.

6. The device of claim 2, wherein various light sources are configured to emit light at various respective wavelengths.

7. The device of claim 2, wherein the pixels are arranged in:

rows, each row being defined by one light guide, the light guide extending over the length of various pixels in the row;

columns, each column being defined by one electrode, the electrode extending over the length of various pixels over the length of the column.

8. The device of claim 1, comprising:

a plurality of convergent lenses aligned parallel to the directional screen, each convergent lens extending around a centre and having the same object focal plane; wherein the screen is placed parallel to each convergent lens;

each convergent lens is associated with pixels of the directional screen;

the emission axis of each pixel associated with the lens converges to the centre of the convergent lens with which said pixels is associated.

9. The device of claim 1, wherein:

two adjacent pixels are separated by a spatial pitch;

the screen comprises a central part, encircled by a peripheral part;

the spatial pitch between two adjacent pixels of the central part is smaller than the spatial pitch between two adjacent pixels of the peripheral part.

10. The device of claim 1, wherein the combiner is a holographic combiner.

11. The device of claim 10, wherein:

the screen emits light in at least one emission spectral band;

the holographic combiner is transparent outside of the at least one emission spectral band;

the holographic combiner forms a convergent lens in the at least one emission spectral band.

12. The device of claim 11, wherein the holographic combiner forms a reflector in the or each emission spectral band.

13. The device of claim 1, wherein the convergent lens is movable translationally with respect to the screen, along the optical axis.

14. The device of claim 1, wherein the convergent lens has a variable focal length.

* * * * *